United States Patent [19]

Birkett et al.

[11] 3,844,661

[45] Oct. 29, 1974

[54] SELF-CLEANING OPTICAL CELL FOR A FLUID ANALYSIS SYSTEM

[75] Inventors: Christopher B. Birkett, Encinitas; Barry D. Epstein, San Diego, both of Calif.

[73] Assignee: General Atomic Company, San Diego, Calif.

[22] Filed: Feb. 14, 1973

[21] Appl. No.: 332,306

[52] U.S. Cl............... 356/184, 250/573, 250/576, 350/61, 356/188, 356/201, 356/246
[51] Int. Cl....................... G01n 1/10, G01n 21/26
[58] Field of Search............ 250/218, 226, 573–576; 356/180, 205, 208, 184, 188, 189, 201, 51, 181, 204, 244, 246; 350/97, 98, 61, 62

[56] References Cited
UNITED STATES PATENTS

| | | | |
|---|---|---|---|
| 2,079,053 | 5/1937 | Torbert, Jr............................ | 350/98 |
| 3,511,573 | 5/1970 | Isreeli................................. | 356/208 |
| 3,551,062 | 12/1970 | Brown................................. | 356/244 |
| 3,609,047 | 9/1971 | Marlow................................ | 356/205 |
| 3,731,091 | 5/1973 | Rosso et al......................... | 250/218 |

Primary Examiner—John K. Corbin
Assistant Examiner—F. L. Evans
Attorney, Agent, or Firm—Fitch, Even, Tabin & Luedeka

[57] ABSTRACT

A system for analyzing the organic content of waste water and the like is disclosed wherein a fluid sample receiving optical cell is provided with a wiper blade assembly operative to wipe opposing optical window surfaces of the cell in synchronized relation with the measurement of selected wavelengths by photosensor means.

10 Claims, 4 Drawing Figures

FIG. 2
FIG. 3
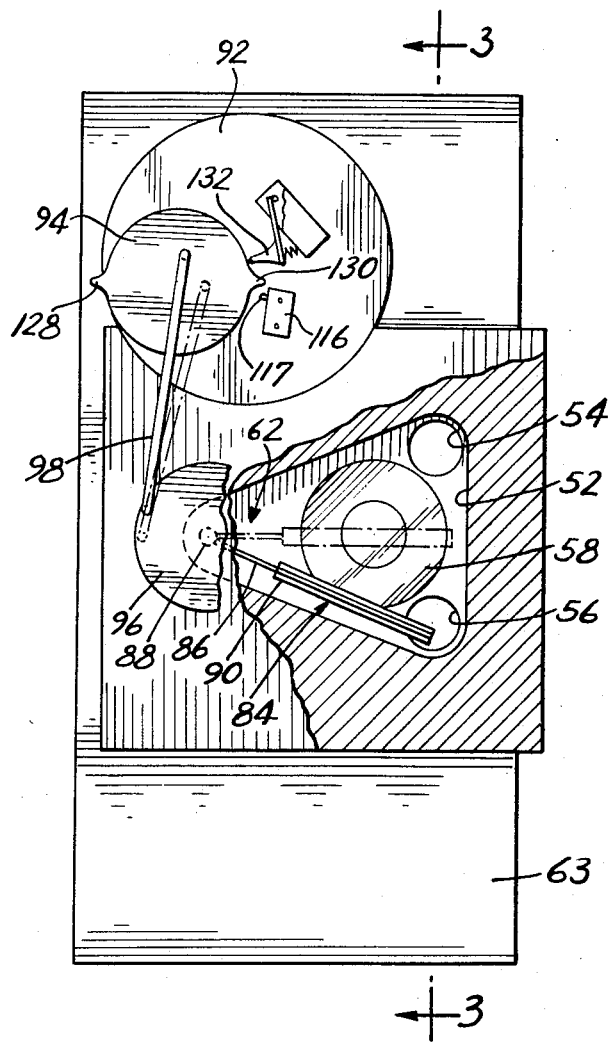
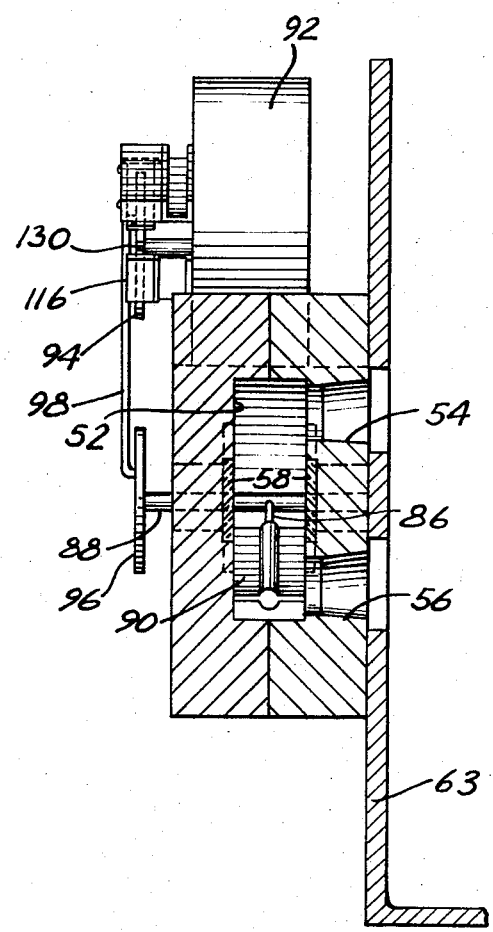

SELF-CLEANING OPTICAL CELL FOR A FLUID ANALYSIS SYSTEM

The present invention relates generally to a system for the optical analysis of waste fluids and the like, and more particularly to such a system having novel means for cleaning an optical cell utilized in the system.

The measurement of the organic content of waste water is an important aspect of pollution control. The ability of a body of water to "metabolize" sewage effluent determines the eventual fate of that receiving water with respect to pollution. One standing procedure to assess the quantity of biodegradable organic matter in waste water is the measurement of the biochemical oxygen demand (BOD). This technique involves the measurement of the rate and quantity of dissolved oxygen utilized in microbial oxidation of the sample diluted in a standard nutrient water. The ordinary measurement period is five days to obtain the carbonaceous biochemical oxygen demand, with periods of 20 days being used to determine both carbonaceous and nitrogenous biochemical oxygen demands. Because this procedure requires several days to complete, it is not practical in the operation of a waste control facility.

As a means of supplanting the BOD test, the chemical oxygen demand (COD) procedure has been developed. The COD technique involves a chemical oxidation of the waste water sample by refluxing with dichromate in 50 percent sulfuric acid. The effects of halides and nitrites is suppressed by the addition of appropriate reagents. The reflux period is normally about two hours. This procedure is also run in batch process, and thus is not completely satisfactory as a continuous control or alarm technique.

While several instrumental procedures have been developed to determine the organic content of waste waters, the instruments require fairly sophisticated handling, high temperature ovens, specialized gas supplies or purifiers, microliter sampling volumes, and other complex instrumentation which do not lend themselves to reliable, low cost, continuous organic carbon monitoring.

More recent advances in spectrophotometric techniques have indicated that one can obtain a reliable measure of the organic content of water or waste water. This technique is based upon the differential absorption of a class of organic compounds at selected wavelengths. This technique has reduced the time required to analyze the organic content of such fluids. In the presence of light scattering centers (large compared to a wavelength) a beam of light is used as the reference intensity which is only scattered by the particulate matter but not absorbed by the dissolved sample. The sample wavelength is chosen so that the dissolved material gives an easily measurable absorbance. Conventionally, the dual wavelength spectrophotometric systems employ an optical cell having windows through which a beam of predetermined wavelength is transmitted from a source to a photosensor disposed on the side of the optical cell opposite the source.

Practical difficulties have been encountered in using optical devices to monitor river waters and effluents which are due mainly to fouling of the optical surfaces of the optical cells. The prior art devices have provided for cleaning the optical window surfaces by either chemical or electrolytic means at various intervals throughout operation. These techniques, however, require either disassembly of the optical cell or shutdown of the analyzing system and are therefore time consuming and inefficient from the standpoint of continuous monitoring of waste fluids. The present invention overcomes the disadvantages in the prior art means for cleaning optical window surfaces of optical cells in fluid analyzing devices.

One of the primary objects of the present invention is to provide novel means for cleaning optical window surfaces of an optical cell for use in a fluid analyzing system or the like.

Another object of the present invention is to provide novel means for cleaning opposed inner surfaces of optical windows in an optical cell wherein the cleaning means is synchronized with the measurement of wavelengths passed through the optical cell so as not to interfere with the wavelengths during the measuring periods.

Another object of the present invention is to provide a waste fluid analysis system which includes a light source, an optical cell adapted to contain a fluid sample therein and having optical windows through which a light beam may pass, photosensor means adapted to receive wavelengths passed through the optical cell, and at least two interference filters movable to effect transmission of selected wavelengths to the photosensor from the optical cell during measuring periods, the optical cell having cleaning means therein synchronized with movement of the filters so as not to interfere with the wavelengths passed through the optical cell during the measuring periods.

Another object of the present invention is to provide novel optical cell cleaning means as described wherein a wiper blade is adapted to engage the opposed aligned surfaces of optical windows in the optical cell and has its movement synchronized with movement of the interference filters such that the wiper blade is caused to simultaneously wipe the opposed optical windows in synchronized relation with measurement of selected wavelengths from the optical cell.

A feature of the invention lies in supporting the interference filters on rotatable means which is operative to position the filters in the light path and effect passage of selective wavelengths to the photosensor for measurement, the rotatable means being rotated at a relatively low speed such a 15 r.p.m.

Further objects and advantages of the present invention, together with the organization and manner of operation thereof, will become apparent from the following detailed description of the invention when taken in connection with the accompanying drawings wherein like reference numerals designate like elements throughout the several views, and wherein:

FIG. 2 is a side elevational view of the optical cell employed in the system of FIG. 1, portions being broken away for purposes of clarity;

FIG. 3 is a vertical sectional view taken substantially along the line 3—3 of FIG. 2, looking in the direction of the arrows.

Figure 1:
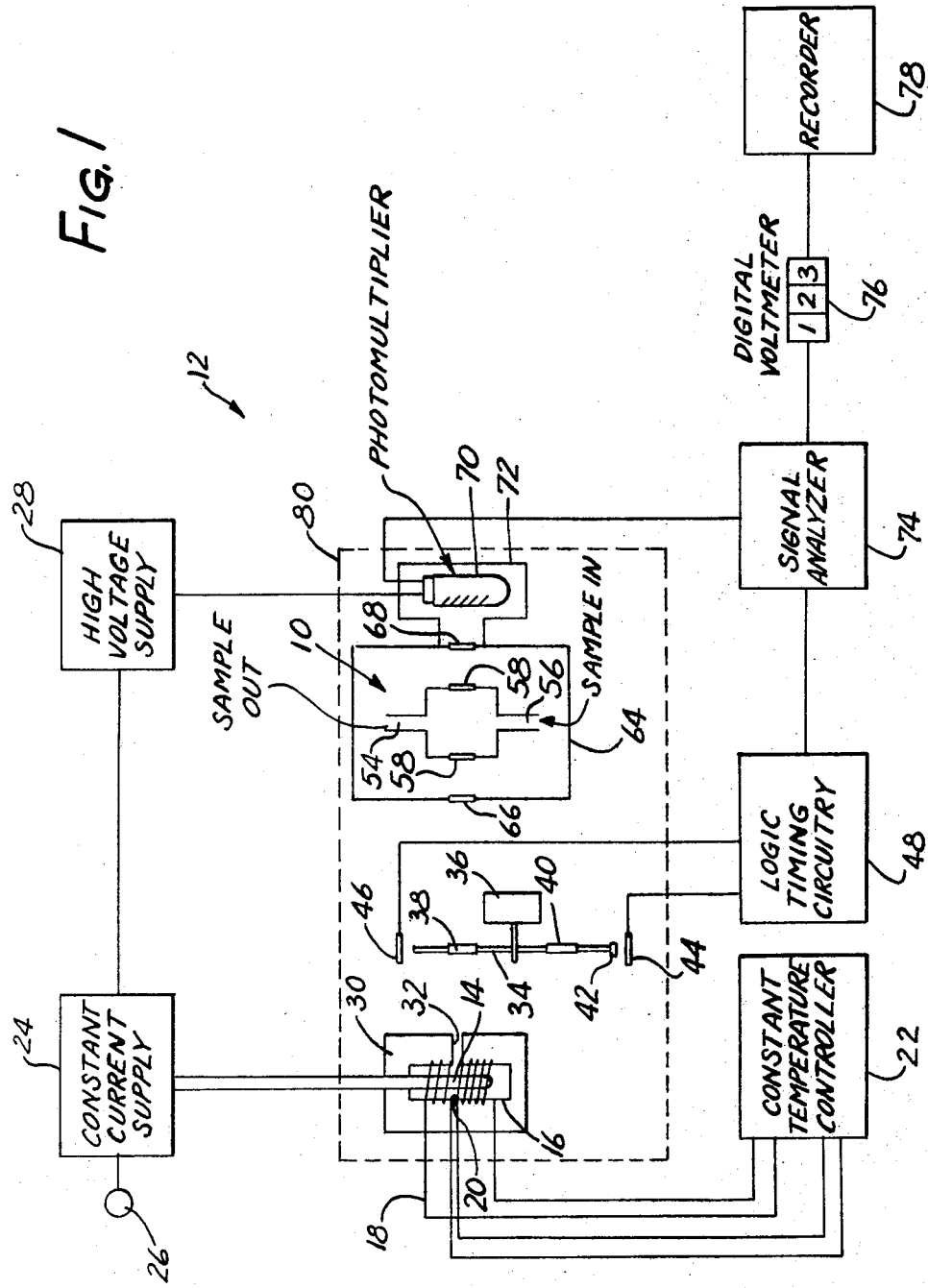
FIG. 1 is a schematic illustration of a dissolved organic carbon analyzer system employing an optical cell in accordance with the present invention.

With reference to FIG. 1, an optical cell constructed in accordance with the present invention is indicated generally at 10 and is illustrated, by way of example, as being employed in a system, indicated generally at 12, for analyzing a sample of waste fluid or the like. The analyzing system 12 comprises a dissolved organic carbon analyzer system which finds particular application in the measurement of the aromatic organic content of waste water and which operates in accordance with the generally known technique of dual wavelength spectrophotometry.

The fluid analyzing system 12 employs a mercury lamp 14 which may comprise a commercially available argon filled low pressure type lamp. The mercury lamp 14 is housed within an aluminum cylinder 16 which is wound or wrapped with an enamelled copper heater wire 18 to give a heater resistance of 10 ohms. A 1,000 ohm beam thermistor 20 is maintained in close contact with the aluminum cylinder which is preferably controlled at 55°C. by a constant temperature controller 22. The heater wires 18 are also connected to the constant temperature controller 22. The mercury lamp 14 is connected to a constant current supply 24 which maintains the lamp current at approximately 4.2 mA at approximately 300 volts. A "lamp on" light 26 is connected in circuit with the mercury lamp 14 and is adapted to light when the mercury lamp 14 has undergone sufficient warmup to light and emit ultraviolet radiation. The constant current supply 24 is connected to a suitable high voltage supply 28.

The mercury lamp 14 and its associated aluminum housing cylinder 16 are preferably contained within a suitable outer insulation shell 30 which has an opening 32 therein aligned with an opening in the housing 16 to allow transmission of a light beam having a spectrum of wavelengths. In the described system 12, the combination of temperature and current regulation for the mercury lamp 14 is intended to produce a stable ratio of intensities of two working wavelengths 2537 A. and 5461 A.

In the illustrated system 12, a circular filter wheel or disc 34 is supported on the output shaft of a synchronous motor 36 which is mounted on a support frame (not shown) in a position such that the filter disc 34 is disposed in the path of the light beam emitted from the opening 32 by the mercury lamp source 14. The synchronous motor 36 is adapted to effect rotation of the filter wheel or disc 34 at a rotational speed of 15 r.p.m. The filter wheel 34 has a pair of diametrically opposed interference filters 38 and 40 supported thereon in a manner to be selectively disposed in the path of the light beam emitted from the mercury lamp 14 as the filter wheel rotates so as to cause the light beam to pass through the optical interference filter 38 or 40 which is disposed in the path of the light beam.

The optical interference filter 38 is supported within a suitable opening in the filter wheel or disc 34, and comprises a 2537 A. interference filter having a 10 percent transmittance neutral density filter sandwiched together therewith. The optical interference filter 40 is suitable supported within a second opening in the filter wheel 34 diametrically opposed to the optical interference filter 38 and comprises a 5461 A. interference filter. A small magnetic member 42 is secured to the outer peripheral surface of the filter wheel 34 for rotation therewith and is cooperative with a pair of diametrically opposed magnetic pickups 44 and 46 connected in a suitable logic timing circuit 48 to sense the filter wheel position so that a portion of the light beam transmitted from the mercury lamp 14 may be sampled at a predetermined time and for a predetermined time duration or period.

It will be understood that the interference filters 38 and 40 could, alternatively, be supported on support means other than the illustrated filter wheel 34 for movement of the filters into alignment with the light beam transmitted from the mercury lamp 14. For example, the interference filters 38 and 40 could be mounted on a support arm which is supported for rotation about an axis intermediate the filters and perpendicular to a plane containing the median planes of the filters. The interference filters could also be mounted on a rectilinearly reciprocally movable supported arm adapted to selectively position the filters in alignment with the light beam from mercury lamp 14. As will become more apparent below, the interference filters 38 and 40 could also be mounted so as to be movable into alignment with the light beam from the lamp 14 after the beam is passed through the optical cell 10.

With reference to FIGS. 2 and 3, taken in conjunction with FIG. 1, the optical cell 10 includes a generally rectangular housing 50 having an internal generally triangular shaped chamber or cavity 52 therein. The housing 50 has a fluid inlet passage 56 and a fluid outlet passage 54 provided therein which communicate with the chamber 52 to facilitate the introduction and removal of a fluid sample into and from the chamber. The inlet and outlet passages 56 and 54 provide means for connecting the optical cell 10 to flow conduits connected to a waste fluid system so as to provide on-line flow of fluid sample through the optical cell for analysis thereof.

The housing 50 of the optical cell 10 is made of a suitable strength material, such as polyvinyl chloride, and has a pair of axially aligned optical windows, one of which is shown at 58 in FIG. 2, provided in the opposite vertical walls thereof. The optical windows 58 may be circular and are made of quartz having a high transmittance in the spectral region of interest. The optical cell 10 has window cleaning means, indicated generally at 62 operatively associated therewith to effect simultaneous cleaning of the inner opposed surfaces of the optical windows 58.

The housing 50 and associated window cleaning means 62 of the optical cell 10 may be mounted on a support bracket, such as indicated at 63, which in turn is supported within an outer waterproof cell housing 64 having provision for connection of the inlet and outlet passages 56 and 54 to the aforementioned sample fluid flow conduits. The housing 64 also has a pair of optical windows 66 and 68 (FIG. 1) axially aligned with the optical windows 58 in the housing 50 to allow the wavelengths from the optical interference filters 38 and 40 to pass through the optical cell 10.

Photosensor means comprising a photomultiplier tube 70 is housed within a light-tight housing or container 72 which is connected in light communication with the optical window 68 in the cell housing 64 so as to be in alignement with the optical windows 58 in the optical cell 10. The photomultiplier tube 70 comprises a suitable side window ultraviolet sensitive type tube incorporating a high impedance, low drift amplifier to minimize stray noise pickup. A dark current adjustment is provided for the photomultiplier tube 70. The signal from the photomultiplier tube 70 is fed to an analog computation circuit 74 where the signal is analyzed, converted to logarithmic form and then displayed on a digital panel meter 76 and an auxiliary recorded output 78 in a known manner. The mercury lamp 14, filter wheel 34, waterproof cell housing 64, optical cell 10 and photomultiplier tube 70 and its associated light-tight housing 72 are supported by a suitable frame structure (not shown) within a secondary light-tight housing, indicated schematically at 80 in FIG. 1, to minimize ambient light pickup by the respective components.

The window cleaning means 62 of the optical cell 10 comprises wiper means having a wiper element, indicated generally at 84, supported within the chamber 52 in the optical cell housing 50. The wiper element 84 includes a support arm 86 having one end connected to a rotatable pivot shaft 88 supported by and between the vertical side walls of the housing 50 so as to traverse the chamber 52. The support arm 86 extends radially from the pivot shaft 88 and supports a generally flat wiper blade 90 made of a suitable material such as polytetrafluoroethylene. The wiper blade 90 is generally rectangular in shape, when considered in plan, and is adapted to engage the inner parallel opposed surfaces of the optical windows 58 in wiping relation therewith upon selective oscillating rotational movement of the pivot shaft 88.

The window cleaning means 62 includes means for effecting oscillating movement of the wiper element 84 across the inner surfaces of the optical windows 58 in synchronized relation with the passage of wavelengths through the sample chamber 52 so as not to interfere with the transmission of the wavelengths through the fluid sample within the sample chamber. To this end, the the window cleaning means 62 includes a synchronous electric drive motor 92 which is connected to and adapted to rotate a circular drive wheel 94 through a connector arrangement (not shown) such as a gear or belt drive assembly. The drive wheel 94 is connected to a circular wiper drive wheel 96 through a connecting linkage or arm 98 having its opposite ends pivotally and eccentrically connected, respectively, to the motor drive wheel 94 and the wiper drive wheel 96. The configuration of the connection of the motor drive wheel 94 to the wiper drive wheel 96 through the connecting arm 98 is such that the wiper element 84 will move through an arcuate path sweeping across the optical windows 58 twice for each revolution of the motor drive wheel 94. It will be understood that suitable sealing rings are provided between the housing 50 and the pivot shaft 88 to prevent fluid leakage outwardly from the fluid sample chamber 52.

Figure 4:
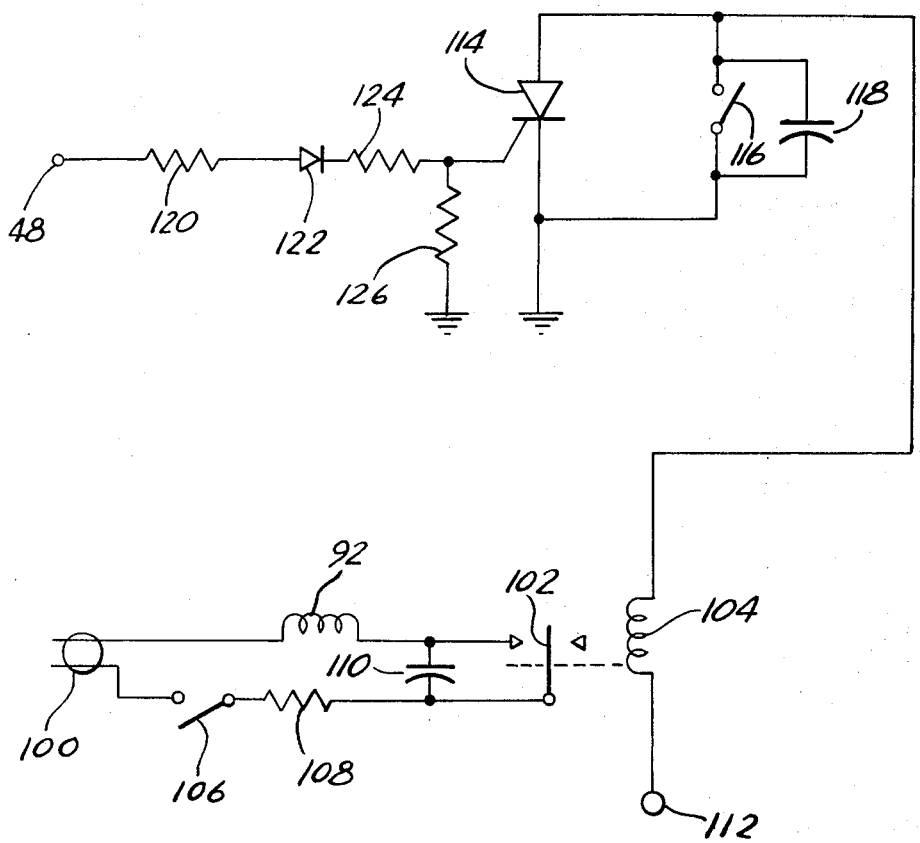
FIG. 4 is a circuit diagram of the synchronizing circuit for effecting movement of the wiper element employed in the optical cell in accordance with the present invention.

The window cleaning or wiper means 62 includes a synchronizing circuit, as shown in FIG. 4, which, in one embodiment of the wiper means, serves to effect a sweeping movement of the wiper blade 90 across the inner surfaces of the optical windows 58 once every four seconds while keeping the wiper blade out of the path of the optical sampling wavelengths transmitted through the optical cell 10.

Noting FIG. 4, the field winding of the motor 92 is connected in circuit with a conventional 110 volt A.C. power supply, the motor circuit having a relay operated switch including a movable contact arm 102 and a coil 104. A main power switch 106 is connected between the power supply 100 and the relay contact arm 102 through a resistor 108. A capacitor 110 is connected in parallel with the relay switch arm 102. The coil 104 of the relay switch is connected between a 15 volt source 112 and ground through a silicon controlled rectifier 114. A microswitch 116 is connected in parallel with the silicon controlled rectifier 114 between the coil 104 and ground, a capacitor 118 being connected in parallel with the microswitch 116. The gate of the silicon controlled rectifier 114 is adapted to receive a voltage pulse from the logic timing circuit 48 through a resistor 120, a diode 122, and a voltage divider network comprising a resistor 124 and a resistor 126.

In the described embodiment, the logic timing circuit 48 is adapted to initiate a timing voltage pulse at the point at which a selected one of the optical interference filters 38 and 40 moves into the light beam emitted from the mercury lamp 14 during rotation of the filter wheel 34. As will become more apparent hereinbelow, the logic timing circuit 48 could be readily adapted to initiate a timing pulse as each of the interference filters 38 and 40 is moved into alignment with the light beam from the lamp 14, or when either one of them is so moved. The timing voltage pulse from the logic timing circuit 48 is applied to the gate of the SCR 114 to effect energizing of the relay coil 104 and move the switch contact 102 to a position completing the circuit of the motor winding 92 and effecting counterclockwise rotation of the drive wheel 94, as considered in FIG. 2. Such rotation of the drive wheel 94 effects movement of the wiper element 84 from a rest position through a sweeping movement across the optical windows 58.

The wiper drive wheel 94 has a pair of diametrically opposed radially extending timing lobes 128 and 130 on its annular peripheral surface which are adapted to depress an actuator 117 of the microswitch 116 twice for each revolution of the drive wheel 94. The microswitch 116 is positioned such that as the wiper element 84 completes a single complete wiping stroke or sweep, one of the timing lobes 128 or 130 actuates the microswitch 116 to close the circuit around the silicon controlled rectifier 114 and de-energize or turn the SCR off whereupon the circuit through the coil 104 is opened and the motor 92 is de-energized. The motor drive wheel 94 thereafter coasts to a new rest position determined by engagement of the cam lobe 128 or 130 which has depressed the microswitch 116 with a spring-loaded rider or stop member 132 as shown in FIG. 2. Thereafter, when a selected one of the optical interference filters, such as 40, again reaches a position interposed between the mercury lamp 14 and the photomultiplier tube 70, the circuit through the SCR 114 will again be closed to energize the coil 104 and start rotation of the drive motor 92 whereby to effect a further sweep cycle of the wiping element 84 across the optical windows 58. This cycle is repeated each time the optical interference filter 40 passes to a position aligned with the beam from the mercury lamp 14. The configurations of elements of the window cleaning means 62 are such that by the time the wiper element 84 begins to sweep across the illuminated field between the optical windows 58, the interference filter 40 has moved sufficiently so that the optical sampling period has terminated.

As noted, the interference filters 38 and 40 could be supported for movement to positions in alignment with the light beam transmitted from the mercury lamp 14 after the beam has passed through the optical cell 10.

In this respect, the fluid sample within the optical cell 10 might absorb certain wavelengths as the light beam is passed through the optical cell. After the beam passes through the optical cell, it is caused to pass alternately through the interference filters 38 and 40 to provide selective wavelengths to the photomultiplier 70 which, in combination with the associated signal analyzer 74, provides a reading of the transmitted intensities which are a function of the absorbance of the fluid sample.

It can be seen that in accordance with our above described optical cell 10 we have provided highly efficient means for effecting cyclical cleaning of the opposed window surfaces of the optical cell through which wavelengths are passed during analysis of fluid sample within the optical cell. Our apparatus is particularly suited for synchronization with an interference filter support means which is rotated at a relatively low r.p.m., such as 15 r.p.m. Further, our described cleaning apparatus provides a self-cleaning optical cell which eliminates the need for disassembly of the optical cell or shutdown of the associated fluid analyzing system with the attendant loss in operating time.

While a preferred embodiment of an optical cell having optical window cleaning means in accordance with the present invention has been illustrated and described, it will be obvious to those skilled in the art that changes and modifications may be made therein without departing from the invention in its broader aspects.

It will also be understood that the self-cleaning optical cell in accordance with out invention may be readily adapted for use with on-line, real time, analyzer systems other than the specific system hereinabove described.

Various features of the invention are defined in the following claims.

What is claimed is:

1. In a system for analyzing a sample of fluid and the like, which system includes source means for emitting a light beam having a spectrum of wavelengths, optical cell means adapted to receive a fluid sample therein and having aligned and spaced optical windows, said optical cell being positioned to allow passage of wavelengths from said source means through said windows, photosensor means positioned to receive wavelengths which pass through said optical cell, and at least two filter elements selectively movable to a position to effect transmission of selected wavelengths from said source means to said photosensor means, the improved combination therewith of wiper means including a wiper element supported within said optical cell and adapted for movement to simultaneously wipe the inner surfaces of said spaced optical windows to remove contaminants therefrom, and actuating means for moving said wiper element in synchronized relation with movement of said filter elements so as to wipe said inner surfaces of said optical windows in predetermined relation to passage of said wavelengths through said windows without impeding passage of said selected wavelengths to said photosensor means.

2. The combination as defined in claim 1 wherein said wiper element includes laterally spaced wiper surfaces adapted to simultaneously wipe the inner surfaces of said spaced optical windows.

3. The combination as defined in claim 1 wherein said system includes a rotatable support means interposed between said source means and said optical cell, and wherein said filter elements are supported by said support means for selective movement to positions effecting passage of predetermined wavelengths through said optical windows of said optical cell, and wherein said actuating means for moving said wiper element is adapted to effect movement of said wiper element to effect wiping of said optical windows when neither of said filter elements is disposed in a position to intersect said beam from said source means.

4. The combination as defined in claim 3 wherein said rotatable support means has two diametrically opposed filter elements supported thereon for movement to intersect said light beam from said source means, and including means for effecting rotation of said support means at a rotational speed of approximately 15 r.p.m., said actuating means for moving said wiper element being adapted to effect movement of said wiper element to wipe said spaced optical windows after each movement of a selected one of said filter elements through a position intersecting said beam from said source means.

5. The combination as defined in claim 1 wherein said wiper element is pivotally mounted within said optical cell, and wherein said actuating means for moving said wiper element includes a drive motor and linkage means interconnecting said drive motor to said wiper element in a manner to effect a single pivotal movement of said wiper element across said spaced optical windows between each passage of a selected one of said wavelengths to said photosensor means and without interfering with passage of said selected wavelengths to said photosensor means.

6. The combination as defined in claim 5 wherein said means interconnecting said drive motor to said wiper element includes a drive wheel rotatably driven by said drive motor and a connecting arm interconnecting said drive wheel to said wiper element in a manner to effect arcuate reciprocating movement of said wiper element across said optical windows to wipe the same during rotational movement of said drive wheel.

7. The combination as defined in claim 6 wherein said drive wheel has timing lobes selectively positioned thereon, and including stop means cooperable with said timing lobes on said drive wheel in a manner to effect stoppage of rotation of said drive wheel when said drive motor is de-energized.

8. The combination as defined in claim 7 wherein said actuating means for moving said wiper element includes a control circuit adapted to control energizing of said wiper drive motor, said control circuit having switch means therein operatively associated with said timing lobes on said drive wheel so as to de-energize said wiper drive motor upon each half-revolution of said drive wheel, said control circuit being adapted to energize said drive motor each time a selected one of said wavelengths is caused to pass through optical windows of said optical cell.

9. An optical cell for use in a fluid analyzing system or the like, said cell comprising generally fluid tight housing means defining a sample chamber therein and having means for passing a fluid sample through said sample chamber, said housing means having a pair of generally aligned spaced optical windows adapted to allow passage of wavelengths through said optical windows and through the fluid sample therebetween, and window cleaning means including a wiper element supported for pivotal movement within said sample chamber in a manner to simultaneously wipe the inner surfaces of said optical windows to remove contaminants therefrom, drive motor means, a drive wheel rotatably driven by said drive motor means when energized, means interconnecting said drive wheel to said wiper element for effecting said movement of said wiper element in a manner to effect a predetermined periodic wiping of said optical windows, said drive wheel having timing lobe means thereon for rotational movement therewith, and including at least one stop member cooperable with said drive wheel in a manner to engage said timing lobe means and effect stoppage of rotation of said drive wheel when said drive motor means is de-energized.

10. An optical cell as defined in claim 9 including a control circuit for effecting selective energizing of said drive motor means, said circuit means including a control switch having a switch actuator engagable by said timing lobes during rotation of said drive wheel so as to de-energize said drive motor means upon actuation of said switch actuator, said control circuit having means for energizing said drive motor each time a selected wavelength passes through said optical cell.

* * * * *

UNITED STATES PATENT OFFICE
CERTIFICATE OF CORRECTION

Patent No. 3,844,661            Dated    October 29, 1974

Inventor(s) Christopher B. Birkett and Barry D. Epstein

It is certified that error appears in the above-identified patent and that said Letters Patent are hereby corrected as shown below:

| | | |
|---|---|---|
| Column 1, line 12 | - | "standing" should be --standard-- |
| Column 2, line 47 | - | "a 15 r.p.m." should be --as 15 r.p.m.-- |
| Column 3, line 18 | - | "beam" should be --bead-- |
| Column 3, line 61 | - | "suitable" should be --suitably-- |
| Column 4, line 16 | - | "supported" should be --support-- |
| Column 5, line 6 | - | "optical cell" should be --photocell-- |
| Claim 8, line 57 | - | insert "said" before "optical windows of said optical cell" |

Signed and sealed this 3rd day of June 1975.

(SEAL)
Attest:

RUTH C. MASON
Attesting Officer

C. MARSHALL DANN
Commissioner of Patents
and Trademarks